B. F. GROUT.
EXTENSION ARM.
APPLICATION FILED OCT. 3, 1914.
1,155,916.
Patented Oct. 5, 1915.
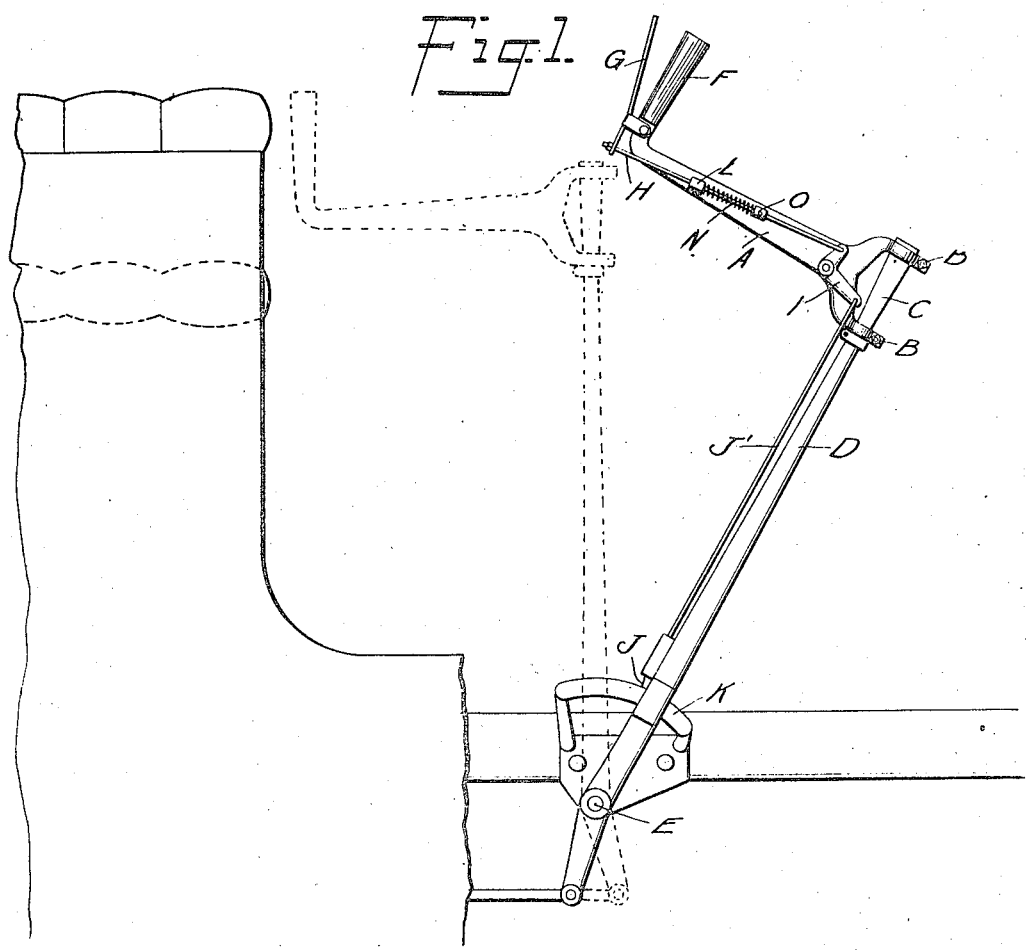
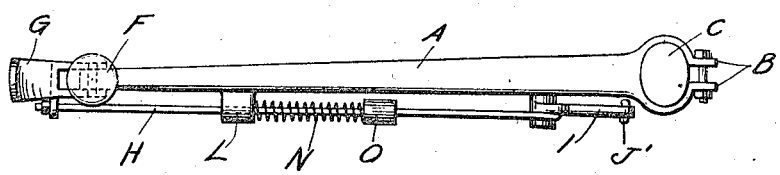
WITNESSES
INVENTOR
Barton F. Grout
BY
ATTORNEYS

UNITED STATES PATENT OFFICE.

BARTON FISK GROUT, OF DERBY, VERMONT.

EXTENSION-ARM.

1,155,916.  Specification of Letters Patent.  Patented Oct. 5, 1915.

Application filed October 3, 1914. Serial No. 864,754.

*To all whom it may concern:*

Be it known that I, BARTON F. GROUT, a citizen of the United States, and a resident of Derby, in the county of Orleans and State of Vermont, have invented a new and Improved Extension-Arm, of which the following is a full, clear, and exact description.

The invention relates to hand brake levers such as are used on automobiles of the Ford or other type, and its object is to provide a new and improved extension arm arranged to permit the driver of the automobile to conveniently reach and manipulate the hand lever without bending down as is now required and practised, and which action is especially inconvenient for women and portly persons.

In order to accomplish the desired result use is made of an extension arm having means at one end for attachment to the lever to be manipulated and provided at either end with an angular handle adapted to be taken hold of by the driver of the car for manipulating the hand lever.

A practical embodiment of the invention is represented in the accompanying drawings forming a part of this specification, in which similar characters of reference indicate corresponding parts in both views:

Figure 1 is a side elevation of an extension arm as applied to the hand brake lever of an automobile of the Ford type; and Fig. 2 is a plan view of the same.

The extension arm A is provided at one end with spaced clamping members B adapted to be clamped onto the handle C of a hand lever D fulcrumed at E on the automobile and connected in the usual manner with the brake mechanism so that when the lever D is swung rearward the brakes are applied in the usual manner. The hand lever D is usually inclined upwardly and forwardly in front of the driver, as indicated in Fig. 1, and it is difficult and inconvenient for women and portly persons to reach the handle C whenever it is desired to swing the lever D rearward for applying the brakes. The arm A is attached to the handle C approximately at a right angle thereto so that the said arm extends upwardly and rearwardly toward the person, and the arm A is provided at its upper end with an angular handle F adapted to be taken hold of by the driver for imparting a rearward swinging motion to the lever D as previously explained.

It will be noticed that by the arrangement described the handle F is within convenient reach of the driver to enable the latter to readily reach the said handle with a view to manipulate the lever D to apply the brakes.

The hand lever D is normally locked in position by a suitable locking device arranged as follows: In close proximity to the handle F is arranged a locking lever G connected by a link H with a bell crank lever I fulcrumed on the arm A near the lower end thereof, and the said bell crank lever I is pivotally connected with the stem J' of a locking bolt J adapted to engage a notched segment K attached to the automobile. The link H slidably engages a bearing L held on the arm A and a spring N is coiled on the link H and abuts with one end on the said bearing L and rests at its other end on a collar O adjustably secured by a set screw or other means to the link H. By the arrangement described the locking bolt J is normally held in locking engagement with the segment K, but when the locking lever G is pressed at the time the driver takes hold of the handle F then the bolt J is withdrawn from the segment K to allow of swinging the lever D with a view to apply the brakes, as previously explained.

It is understood that the extension arm A can be readily applied to the hand lever D of cars as now generally built and used, it being understood that it is only necessary to transfer the locking lever G from the lever D to the arm A and connecting the stem J' with the bell crank lever I.

Having thus described my invention, I claim as new and desire to secure by Letters Patent:

1. An extension arm for the brake device of automobiles and the like, comprising an arm having an angular handle at one end and provided at its other end with clamping members for securing it to a brake lever, a hand lever pivoted intermediate of its ends to the handled end of the arm and extending along the side of the handle, a bell crank lever pivoted to the end of the arm having the clamping member, a link connecting one end of the hand lever with one member of the bell crank lever, and a spring for holding the hand lever away from the handle of the arm.

2. An extension arm for the brake lever of automobiles and the like, consisting of an arm having a handle at one end, means at its other end for detachably securing it to a brake lever, and a bearing intermediate of its ends, a hand lever pivoted to the arm adjacent its handle, a bell crank lever mounted on the end of the arm opposite that of the handle, a link passing through the bearing of the arm and pivoted to the hand lever and bell crank lever, the link being provided with a collar, and a spring on the link between the said collar and bearing.

In testimony whereof I have signed my name to this specification in the presence of two subscribing witnesses.

BARTON FISK GROUT.

Witnesses:
A. W. KIMBALL,
W. E. GROW.